No. 776,580. PATENTED DEC. 6, 1904.
E. F. WILSON.
FRUIT HARVESTER.
APPLICATION FILED MAR. 18, 1904.
NO MODEL. 2 SHEETS—SHEET 1.
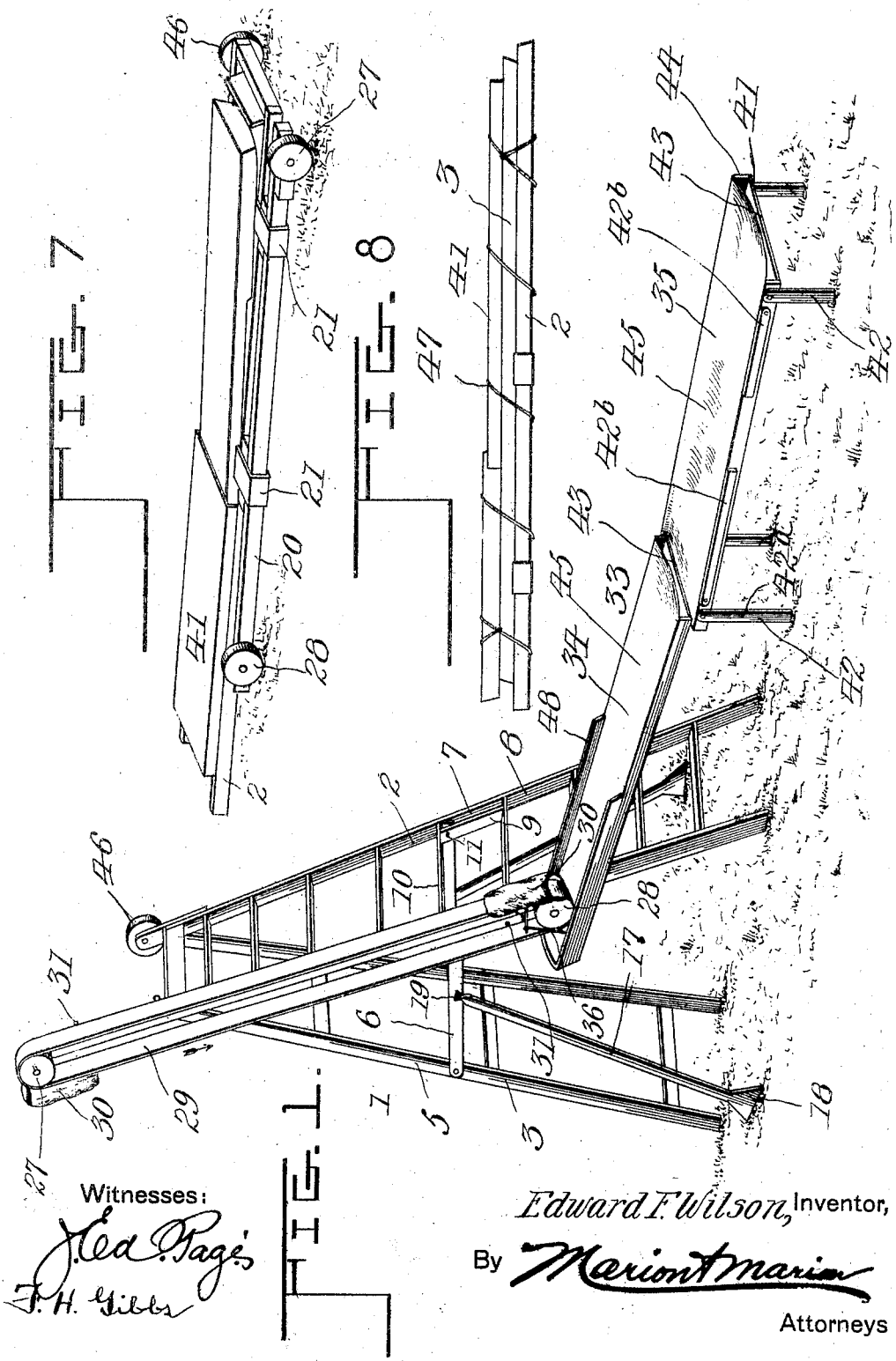
Witnesses:
Edward F. Wilson, Inventor,
By Attorneys

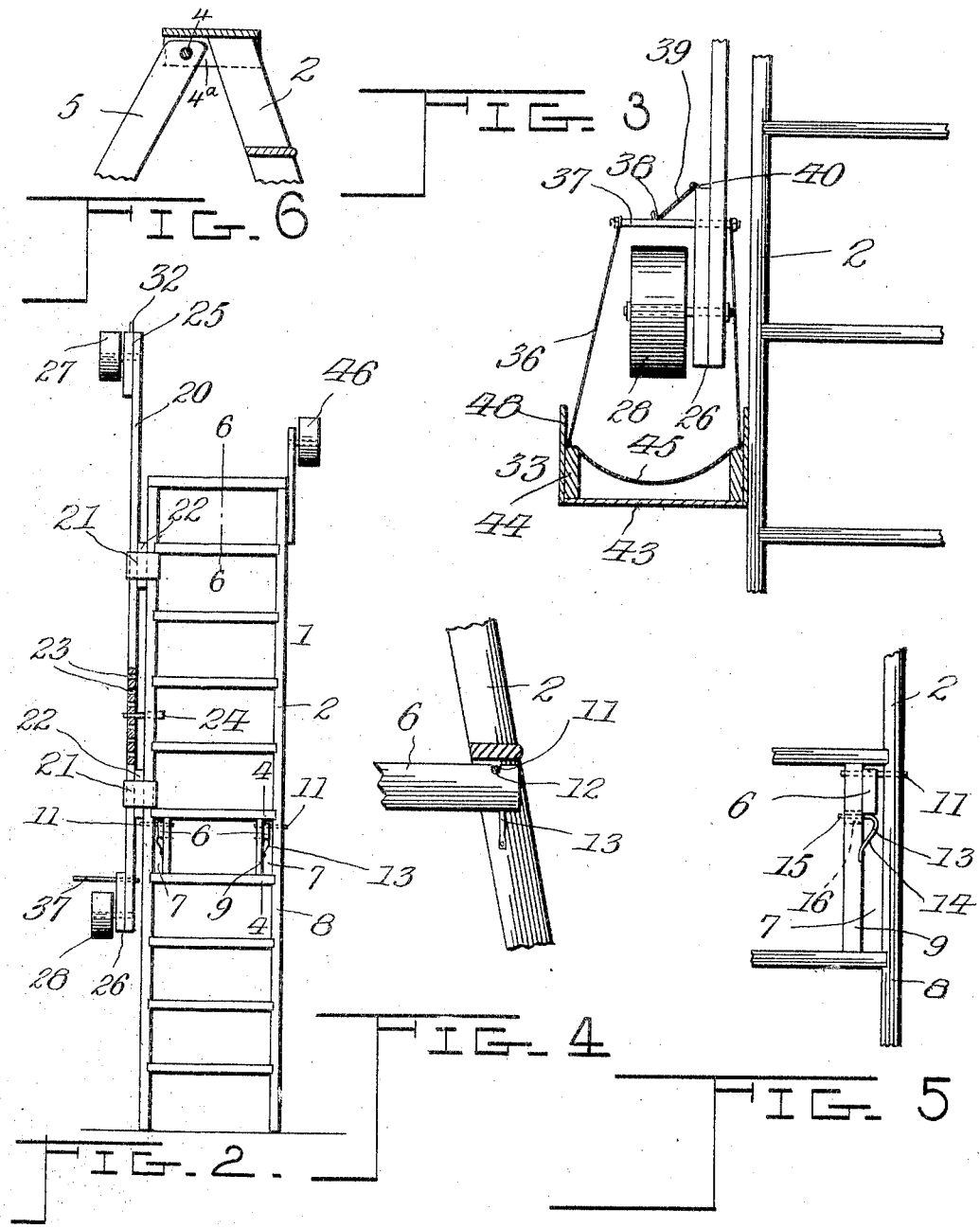

No. 776,580.

Patented December 6, 1904.

UNITED STATES PATENT OFFICE.

EDWARD FRANCIS WILSON, OF SALT SPRING ISLAND, CANADA, ASSIGNOR OF ONE-HALF TO HENRY RUCKLE, OF SALT SPRING ISLAND, CANADA.

FRUIT-HARVESTER.

SPECIFICATION forming part of Letters Patent No. 776,580, dated December 6, 1904.

Application filed March 18, 1904. Serial No. 198,722. (No model.)

*To all whom it may concern:*

Be it known that I, EDWARD FRANCIS WILSON, a subject of the King of Great Britain, residing at Salt Spring Island, county of Victoria, Province of British Columbia, Canada, have invented certain new and useful Improvements in Fruit-Harvesters; and I do hereby declare that the following is a full, clear, and exact description of the invention, such as will enable others skilled in the art to which it appertains to make and use the same.

My invention relates to fruit-harvesting; and my object is to produce a device especially adapted for facilitating the gathering of fruit, such as apples and pears.

The invention contemplates the picking of the fruit from the branches of the trees, and special arrangements are made for bringing the apples to the ground from time to time as they are gathered without danger of injuring the same and without entailing a substantial loss of time by the operation.

A special object has been to produce a device which is very simple in construction and inexpensive and which is adapted to be folded up when not in use into a compact bundle.

Special arrangements are made for facilitating the transportation of the device from place to place.

The invention consists, substantially, of a specially-constructed ladder adapted to be set up near the tree the fruit of which is to be picked, the said ladder being provided with attachments adapted to the purposes mentioned.

The invention consists in the construction and combination of parts to be more fully described hereinafter, and definitely set forth in the claims.

In the drawings, which fully illustrate my invention, Figure 1 is a perspective representing the device as set up ready for use. Fig. 2 is a front elevation, certain parts being broken away and shown in section, and other parts, which are represented in Fig. 1, are not shown in this view. Fig. 3 is a vertical section through a portion of a chute constituting a part of the invention, a portion of the ladder to which the chute is attached being shown also. This view is upon a somewhat enlarged scale. Fig. 4 is a vertical section taken substantially on the line 4 4 of Fig. 2, but representing the parts upon an enlarged scale. Fig. 5 is a front elevation of the parts shown in Fig. 4. Fig. 6 is a vertical section taken substantially on the line 6 6 of Fig. 2. Fig. 7 is a perspective representing the device in a folded condition when especially adapted for being moved about. Fig. 8 is a side elevation representing the device as folded into a compact bundle.

Throughout the drawings and specification the same numerals of reference denote like parts.

Referring more particularly to the parts, 1 represents the ladder, which is of a common type, comprising a front standard 2 and a rear standard 3, attached together above by means of pintles 4 for passing through the plates $4^a$, which latter are rigidly connected with the front standard 2, said ladder being adapted to assume when set up substantially the appearance of an A in side elevation. The rear standard 3 comprises two legs 5, which have pivotally attached thereto distance-bars 6, the same being attached preferably at substantially the height indicated. The forward extremities of these distance-bars 6 are received in spaces 7, which are formed between the side bars 8 and strips 9, the said strips being disposed as shown, so as to connect two adjacent steps 10 of the ladder. Pins 11 extend transversely across these spaces 7, preferably at the upper portion thereof, as shown, and these pins are intended to be received by notches 12, formed, respectively, in the upper edges of the distance-bars 6, as indicated most clearly in Fig. 4. The bars 6 having been pushed up so that they assume the position indicated in Figs. 4 and 5, they are maintained in the relation shown by means of springs 13, attached to the inner faces of the strips 9, the said springs being preferably of the form shown, comprising inclined extensions 14 and integral substantially horizontal extensions 15 disposed above, the said last extensions passing loosely through openings 16 in the strips, as indicated. It should be understood that the springs 13 could be readily pressed inwardly by one's hand, so as to allow the distance-bars to be disconnected. In connection with the said bars 6 side braces 17 are employed, the same having expanded feet 18 setting upon the earth, said side braces being attached by means of detachable hooks 19.

To one of the side bars or legs 8 of the forward standard 2, preferably the left leg, there is attached an extension-bar 20, the same being longitudinally slidable through metal straps 21, which hold the same against fixed distance-blocks 22, as shown. Arrangement is made for securing this extension-bar at different vertical heights, which arrangement consists in providing a plurality of openings 23, which may coöperate with a removable tapered peg 24, passing through an opening in the adjacent side member 8, as indicated. At its extremities the extension-bar 20 is reinforced, so as to form heads 25 and 26, and upon these heads are mounted pulleys 27 and 28. Over these pulleys a belt 29 runs, the said belt being provided at opposite points with bags 30, which are permanently attached thereto in any suitable manner. The inner edge of the belt 29 is provided with loops or eyes 31, which may receive a pin 32, which is attached in the head 25 for the purpose of securing the belt against movement. It should be understood that in practical use the belt 29 would be moved and secured in substantially the position in which it is represented in Fig. 1—that is, with one of the bags 30 in an elevated position adapted to receive apples as they are picked from the branches of the tree. When the bag becomes filled, the ring or loop 31, which is secured to the pin 32, would be disconnected and the weight of the apples in the bag allowed to cause their descent, as will be readily understood. As they descend the velocity of the load would be controlled by one's hand, which could be laid upon the belt, so as to afford a frictional resistance.

The bags 30 are adapted to dump their contents into a chute 33, said chute being composed of sections 34 and 35, as shown, the main section 34 being suspended from the lower head 26 by means of cords 36, which cords attach to the extremities of a long bolt 37, the same being disposed preferably above the lower pulley 28, as indicated, and passing across the space inclosed between the sides of the belt. This bolt 37 is preferably provided with an eye 38, which coöperates with a hook 39, the same being attached at 40 to the head, as indicated. The section 35 of the chute consists substantially of a rudely-constructed table 41, having legs 42 pivoted to the side thereof, as shown, the said legs being adapted to fold up at the side of the chute when not in use and being preferably arranged in two sets 42$^a$ and 42$^b$, the sets of legs being adapted to support the table at different heights. Both sections of the chute have bottoms 43 and upwardly-projecting side flanges 44, which side flanges support aprons 45 of fabric or similar material, as shown. The outer extremity of the section 34 of the chute is preferably supported upon the section 35 of the chute.

At the upper extremity of the ladder 1 and at the side opposite to the belt 29 there is attached a wheel 46, and this wheel is for the purpose of facilitating the moving of the device from place to place about an orchard when the device is in a folded condition, as shown in Fig. 7, at which time the extension-bar 20 would be secured so that the pulley 27 would be in substantial alinement with the wheel 46. The wheel 46 would have the same diameter as the pulley preferably, so that when the parts are arranged as indicated the device may be trundled along like a wheelbarrow, the pulley-wheel 46 constituting virtually a truck.

Where the device is to be permanently folded, the parts may be brought into more compact form, as shown in Fig. 8, the wheel 46 and the pulleys having been removed and stowed within the bundle. The parts may be secured in this folded condition by means of a cord 47, wrapped about the same, as shown.

The legs of the chute-section 35 which are nearest the harvester are of greater length, so that the chute inclines toward its outer extremity. The inclination, however, is gradual, so that the fruit passing down the chute will not be bruised as it passes from the chute into bags or receptacles to receive the same. Evidently the chute-section 34 accommodates itself to any of the possible positions of the extension-bar 20. This section of the chute is provided with guard-flanges 48, near the upper extremity thereof, to prevent any possibility of the fruit falling from the chute at the sides at this point.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In a fruit-harvester, in combination, a ladder, an extension-bar attached to the side of said ladder and movable longitudinally thereof, a conveyer-belt carried by said extension-bar, bags carried by said belt, and a chute adapted to be delivered to by said bags.

2. In a fruit-harvester, in combination, a ladder, an extension-bar carried at the side of said ladder and movable longitudinally thereof, pulleys carried by said bar, a belt carried by said pulleys, bags carried by said belt, a chute, and means for suspending the inner extremity of said chute at the lower extremity of said extension-bar.

3. In a fruit-harvester, in combination, a ladder, a slidable extension-bar, a conveyer-belt carried at the side of said ladder upon said slidable bar, eyes carried at the edge of said belt, a pin with which said eyes may coöperate to secure said belt, and bags carried by said belt.

4. In a fruit-harvester, in combination, a ladder, a wheel carried thereby at the upper extremity thereof, a pulley near the upper extremity of said ladder and which may aline with said wheel, a second pulley, a belt passing over said pulleys, and bags carried by said belt.

5. In a fruit-harvester, in combination, a ladder, a wheel attached at the upper extremity thereof at one side, an extension-bar slidably connected with the side of said ladder opposite said wheel, means for locking said slidable bar in different positions on said ladder, pulleys carried by said extension-bar, means for adjusting said extension-bar longitudinally, a removable belt carried by said pulleys, bags carried by said belt, and means for securing said belt against movement.

6. In a fruit-harvester, in combination, a ladder, a slidable extension-bar attached at one side thereof, said bar and said ladder having openings which may aline, a pin adapted to pass through said openings to secure said bar, pulleys carried by said bar, a belt passing over said pulleys, means for securing said belt against movement, and a wheel attached to said ladder at the upper extremity thereof and opposite to said extension-bar.

7. In a fruit-harvester, in combination, a ladder, a slidable extension-bar carried at the side thereof, a conveyer-belt carried by said extension-bar, bags carried by said belt, a chute comprising a main section and an outer section, means for supporting said main section from the lower extremity of said extension-bar at its inner extremity, said outer section constituting a support for said main section at its outer extremity.

8. In a fruit-harvester, in combination, a ladder, a slidable extension-bar carried thereby, a conveyer carried by said slidable bar, and a chute attached to the lower extremity of said extension-bar, said chute having a bottom of fabric.

9. In a fruit-harvester, in combination, a ladder, a conveyer attached at the side thereof and adapted to lower fruit, a slidable extension-bar supporting said conveyer, a chute adapted to receive the fruit and including a main section, means for suspending said main section from said conveyer, an outer chute-section, said outer section having legs to support the same and constituting a support for the outer extremity of said main section.

10. In a fruit-harvester, in combination, a longitudinally-slidable conveyer, a chute adapted to receive the fruit from the said conveyer, said chute comprising a main section and an outer section, means for supporting said main section at said conveyer, said outer section having legs of different lengths adapted to adjust the same, said outer section constituting a support for the outer extremity of said main section.

In witness whereof I have hereunto set my hand in the presence of two witnesses.

EDWARD FRANCIS WILSON.

Witnesses:
F. B. PEMBERTON,
T. L. NEALE.